(12) United States Patent
Reitsma et al.

(10) Patent No.: US 9,961,619 B2
(45) Date of Patent: May 1, 2018

(54) METHOD FOR INTELLIGENTLY AND DYNAMICALLY SELECTING BEACON TRANSMITTING NODES IN AD-HOC NETWORKS

(71) Applicant: MOTOROLA SOLUTIONS, INC., Schaumburg, IL (US)

(72) Inventors: Katrin Reitsma, Chicago, IL (US); Anthony R. Metke, Naperville, IL (US)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 213 days.

(21) Appl. No.: 14/704,698

(22) Filed: May 5, 2015

(65) Prior Publication Data

US 2016/0330675 A1     Nov. 10, 2016

(51) Int. Cl.
*H04W 48/16* (2009.01)
*H04W 84/18* (2009.01)
*H04W 76/02* (2009.01)
*H04W 48/20* (2009.01)
*H04W 88/06* (2009.01)

(52) U.S. Cl.
CPC ......... *H04W 48/16* (2013.01); *H04W 76/025* (2013.01); *H04W 84/18* (2013.01); *H04W 48/20* (2013.01); *H04W 88/06* (2013.01)

(58) Field of Classification Search
CPC ..... H04W 84/18; H04W 48/04; H04W 48/16; H04W 52/0229; H04W 52/0241
See application file for complete search history.

(56) References Cited

U.S. PATENT DOCUMENTS

| | | | |
|---|---|---|---|
| 8,817,617 B2 | 8/2014 | Hellwig et al. | |
| 2006/0114881 A1* | 6/2006 | Chari | H04L 45/125 370/351 |
| 2007/0053315 A1 | 3/2007 | Sugaya | |
| 2009/0262673 A1 | 10/2009 | Hermersdorf | |
| 2010/0008276 A1 | 1/2010 | Kopikare et al. | |
| 2010/0157960 A1 | 6/2010 | Banerjee et al. | |

(Continued)

OTHER PUBLICATIONS

Kneckt et al., Response Criteria of Probe Request, IEEE 11-12/0553r4, May 15, 2012, 14 pages.*

(Continued)

*Primary Examiner* — Hoon J Chung
(74) *Attorney, Agent, or Firm* — Michael Best & Friedrich LLP

(57) ABSTRACT

A method of transitioning a wireless networking device from a non-access point mode to an access point mode includes receiving a find network request from another wireless networking device and sending a find network response including beacon data and an identifier. The method includes receiving a join network request from the other wireless networking device and associating with the other networking device by transitioning from a default mode to an access point mode. The other wireless networking device then operates as a client device. Each wireless networking device in the default mode listens for other wireless networking devices seeking an access point for the wireless network. In the access point mode the wireless networking device periodically broadcasts beacons. Each wireless networking device transitions to a client-only mode, when limiting conditions are present.

15 Claims, 5 Drawing Sheets

(56) References Cited

U.S. PATENT DOCUMENTS

| | | | |
|---|---|---|---|
| 2011/0246637 A1* | 10/2011 | Murakami | H04W 84/20 |
| | | | 709/223 |
| 2012/0099572 A1* | 4/2012 | Kato | H04W 88/06 |
| | | | 370/338 |
| 2012/0188991 A1 | 7/2012 | Kholaif et al. | |
| 2013/0039352 A1 | 2/2013 | Ruster et al. | |
| 2014/0044113 A1 | 2/2014 | Chu | |
| 2014/0269476 A1 | 9/2014 | Weston et al. | |
| 2015/0043539 A1 | 2/2015 | Senese et al. | |

OTHER PUBLICATIONS

PCT/US2016/028908 International Search Report and Written Opinion of the International Searching Authority dated Aug. 30, 2016 (19 pages).

Anastasi, Giuseppe et al. "Energy Conservation in Wireless Sensor Networks: A Survey." Ad Hoc Networks May 2009 (vol. 7, Issue 3,): 537-568.

* cited by examiner

METHOD FOR INTELLIGENTLY AND DYNAMICALLY SELECTING BEACON TRANSMITTING NODES IN AD-HOC NETWORKS

BACKGROUND OF THE INVENTION

A wireless ad hoc network is a decentralized type of network. In comparison to infrastructure-based wireless networks, ad hoc networks are self-forming wireless networks which can operate in the absence of any fixed infrastructure, and in some cases an ad hoc network is formed entirely of mobile units. An ad hoc network typically includes a number of geographically-distributed, potentially mobile units, sometimes referred to as "nodes," which are wirelessly connected to each other by one or more links (e.g., radio frequency communication channels). The nodes can communicate with each other over a wireless media without the support of an infrastructure-based or wired network. In addition, the nodes in a wireless ad hoc network typically transmit "beacons." A beacon (for example, a beacon frame) contains information about the network and is typically broadcast periodically to announce the presence of the network to nodes that may wish to join the network.

Wireless ad hoc networks are beneficially implemented to provide communication mechanisms for emergency services such as police, fire, and others at the site of an emergency or at a similar incident site. For instance, natural disasters can cause extensive damages to land-based telecommunication infrastructures. In such circumstances, wireless ad hoc networks can be substituted to provide messaging capabilities for both the rescuers and the victims. Such a wireless ad hoc network can, for example, be part of an incident area network. When nodes in incident area networks actively participate in forwarding routing requests and providing beacons, 1) network overhead and 2) power usage may be increased. Increased network overhead has an impact on the ability to transmit, for example, voice and data messages because bandwidth is used to transmit management information (for example, beacons) rather than messages. Increased power usage can have a negative impact on battery life and many nodes in a wireless ad hoc network are often battery powered. Many existing techniques and protocols cannot address these two issues when ad-hoc wireless networks have a large number of nodes, very mobile nodes, dynamic node memberships, or a combination of these characteristics.

Accordingly, there is a need for intelligent and dynamic selection of beacon transmitting nodes in wireless ad hoc networks.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
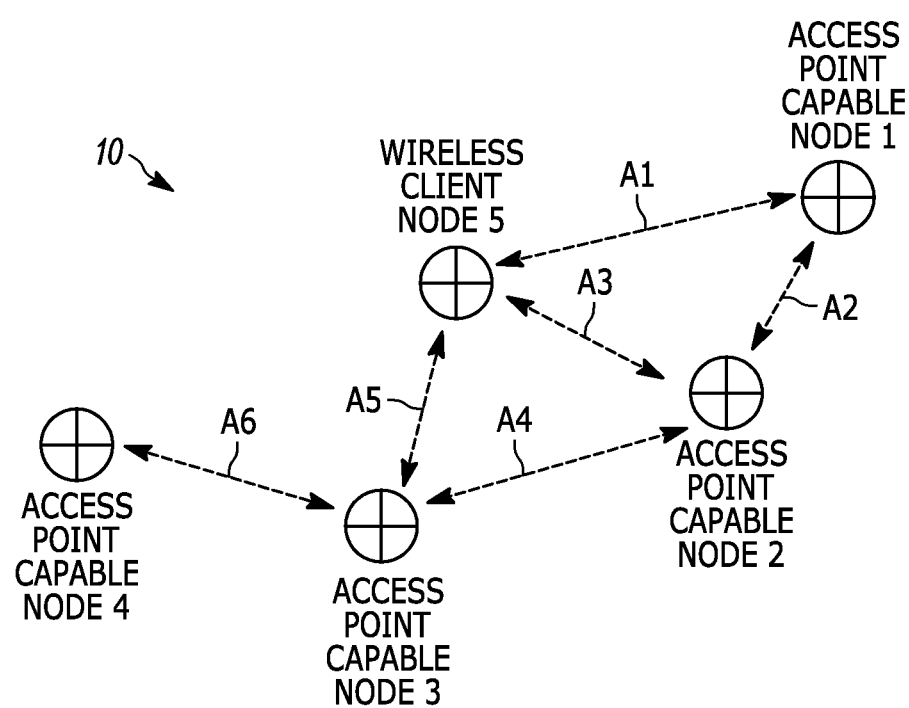
FIG. 1 is an ad hoc topology diagram of nodes of a wireless ad hoc network in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

Embodiments include methods for transitioning a wireless networking device from a non-access point mode to an access point mode. In one embodiment, a method includes setting an operating mode to a non-access point mode, and operating in a wireless network as a non-access point. The method includes receiving a find network request and responding with a find network response, and receiving a join network request and responding with a join network response. The method further includes transitioning to an access point mode to associate with and offer connectivity to other wireless networking devices based on receiving the join network request.

Another embodiment provides a wireless networking device that includes a radio transceiver for communicating within a wireless network, and a processor programmed to operate in a default mode and to determine whether limiting conditions are present, and when limiting conditions are present, the wireless networking device transitions to a client-only mode. The processor also determines that another wireless networking device is seeking to join the wireless network and to enable the other wireless networking device to associate as a client wireless networking device by transitioning the wireless networking device to an access point mode and broadcasting a beacon. When the processor determines that limiting conditions are not present and that no other wireless networking device is seeking to join the wireless network, maintain the wireless networking device in or transition the wireless networking device to the default mode and continue to determine whether limiting conditions are present and whether another wireless networking device is seeking to join the wireless network.

Yet another embodiment provides a method of transitioning a first wireless networking device from an access point mode, wherein the first wireless networking device is broadcasting beacons, to a default mode. The method includes determining with the first wireless networking device that a second wireless networking device has disassociated from the first wireless networking device and that no other wireless networking devices are associated with the first wireless networking device as an access point. Thus, the method transitions the first wireless networking device from the access point mode to a default mode. In the default mode, the first wireless networking device does not broadcast beacons.

Embodiments may involve an ad hoc wireless networking device that can change modes of operation. The three modes are, for example, access point (AP) mode, default mode, and client-only mode. When in the access point mode, the wireless networking device acts as an access point. In one implementation, the wireless networking device is designed to conform with a local area network standard, for example, the Institute of Electrical and Electronics Engineers (IEEE) 802.11 standard (hereafter simply "802.11"). (For these and any Institute of Electrical and Electronics Engineers (IEEE) standards recited herein, see: http://standards.ieee.org/get-ieee802/index.html or contact the IEEE at IEEE, 445 Hoes Lane, PO Box 1331, Piscataway, N.J. 08855-1331, USA.) In such an embodiment, the wireless networking device complies with the 802.11 standard for access point operations. When in the default mode, the wireless networking device acts as an 802.11 station (STA) and complies with the 802.11 standard for STA operations. When in the client-only mode, the wireless networking device acts as an 802.11 station and complies with the 802.11 standard for station operations. Herein the term "non-access point" mode is used to mean either the client-only mode or the default mode described above and, as a consequence that the wireless networking device does not act as an access point. A wireless networking device that can use the methods described herein to change between these three modes is considered "access-point capable."

FIG. 1 is an ad hoc topology diagram showing a wireless network 10 having four access-point capable nodes (node 1, node 2, node 3, and node 4). The wireless network 10 also includes a wireless client node (node 5) that is not capable of operating as an access point. The arrows (A1, A2, A3, A4, etc.) located between the nodes represent communication paths between the nodes and provide an indication that the nodes are capable of communication with each other, i.e., within a communication range of each other. A communication route or path may be formed as, for example, a message "hop" from one node to the next until arriving at a desired destination node. Node 1 through node 4 represent or correspond to ad hoc wireless networking devices that are designed or configured to operate in either a non-access point mode or an access point mode. Thus, each of node 1 through node 4 is capable of use as an access point that broadcasts beacons when operated in access point mode.

Figure 2:
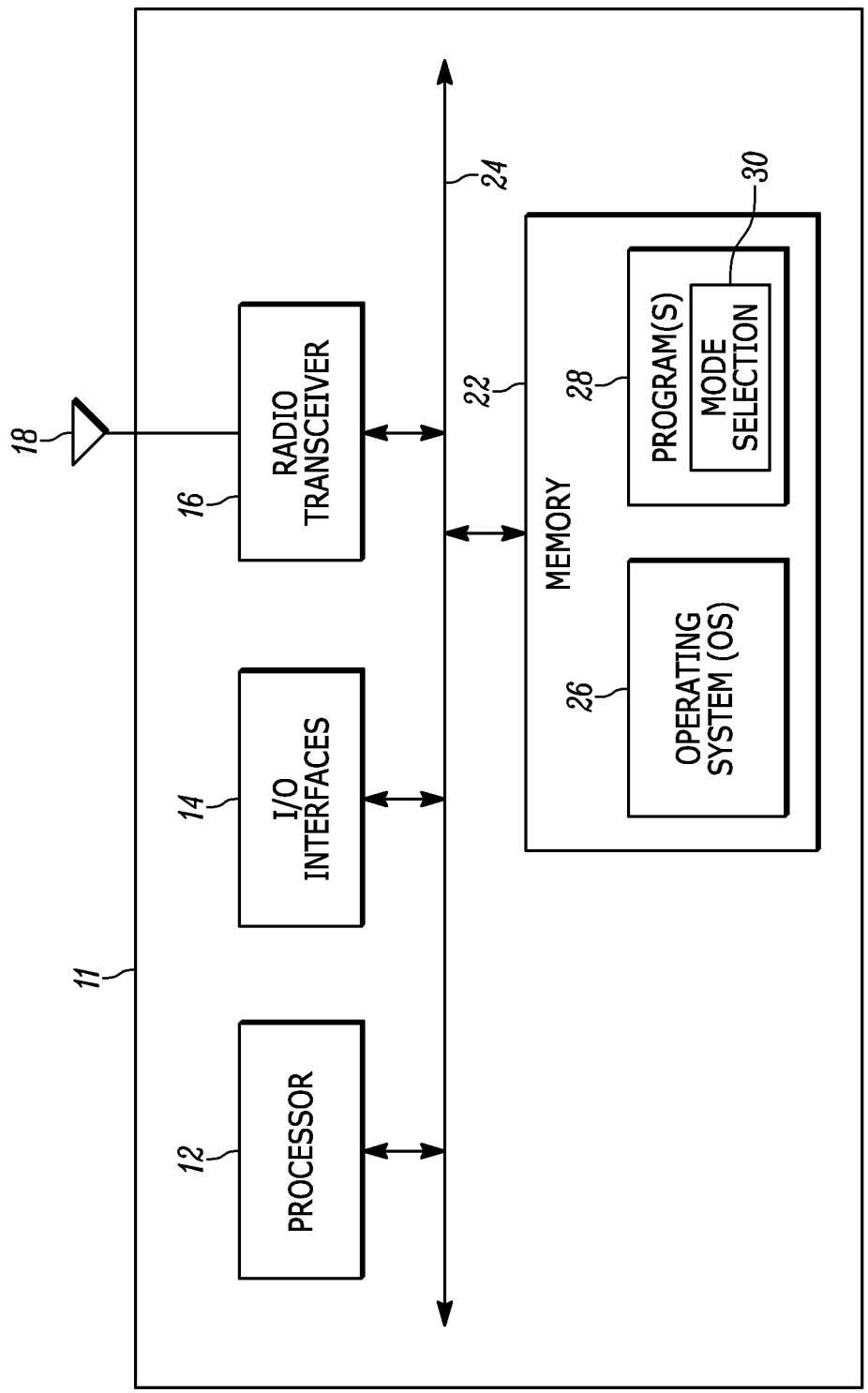
FIG. 2 is a block diagram of an ad hoc wireless networking device in accordance with some embodiments.

FIG. 2 is a block diagram of an exemplary ad hoc wireless networking device 11. The ad hoc wireless networking device 11 includes a processor 12 (e.g., a microprocessor or similar device), an input/output (I/O) interface 14, and a radio transceiver 16. The radio transceiver 16 is connected to an antenna 18. The radio transceiver 16 shown in FIG. 2 includes a transmitter and a receiver that enable wireless communication within a wireless network 10 (such as shown in FIG. 1). The ad hoc wireless networking device 11 also includes a memory 22. It should be appreciated by those of ordinary skill in the art that FIG. 2 depicts the ad hoc wireless networking device 11 in a simplified manner, and a practical embodiment can include additional components and suitably configured processing logic, software, or both to support known or conventional operating features that are not described in detail herein. The components (processor 12, I/O interface 14, radio transceiver 16, antenna 18, and memory 22) are communicatively coupled via a local interface 24. The local interface 24 can be, for example but is not limited to, one or more buses or other wired or wireless connections, as is known in the art.

The radio transceiver 16 may operate using any number of suitable wireless data communication protocols, techniques, or methodologies. In some embodiments, the radio transceiver 16 supports, without limitation: (radio frequency) RF; Land Mobile Radio (LMR); IrDA (infrared); Bluetooth; ZigBee (and other variants of the IEEE 802.15 protocol); IEEE 802.11 (any variation); IEEE 802.16 (WiMAX or any other variation); Direct Sequence Spread Spectrum; Frequency Hopping Spread Spectrum; Long-Term Evolution (LTE); cellular/wireless/cordless telecommunication protocols (e.g. 3G/4G, etc.); wireless home network communication protocols; paging network protocols; satellite data communication protocols; wireless hospital or health care facility network protocols such as those operating in the Wireless Medical Telemetry Service (WMTS) bands; General Packet Radio Service (GPRS); Project 25 (P25) encryption standard; Terrestrial Trunked Radio (TETRA), Digital Mobile Radio (DMR), proprietary wireless data communication protocols such as variants of Wireless Universal Serial Bus (USB); and any other protocols for wireless communication.

In one embodiment shown in FIG. 2, when the ad hoc wireless networking device 11 is in operation, the processor 12 executes software stored within the memory 22, transfers data to and from the memory 22, and controls operations of the ad hoc wireless networking device pursuant to the software instructions.

The I/O interface 14 can be used to receive user input from and/or for providing system output. User input can be provided via, for example, a keypad, a touch screen, a scroll ball, a scroll bar, buttons, and the like. System output can be provided via a display device such as a liquid crystal display (LCD), touch screen, and the like. The I/O interface 14 can include a graphical user interface (GUI) that enables a user to interact with the ad hoc wireless networking device 11.

Memory 22 shown in FIG. 2 can include volatile memory elements (e.g., random access memory (RAM)), nonvolatile memory elements including read only memory (ROM), or other computer-readable storage. As noted above, memory 22 includes one or more software programs. In the example of FIG. 2, the software in the memory 22 includes a suitable operating system (OS) 26 and executable programs 28. The executable programs 28 include various applications, including applications that implement all or part of methods, processes, and operations described herein. One program is a mode selection program 30 or algorithm to transition between the modes of an ad hoc wireless networking device 11.

Operating States

Figure 3:
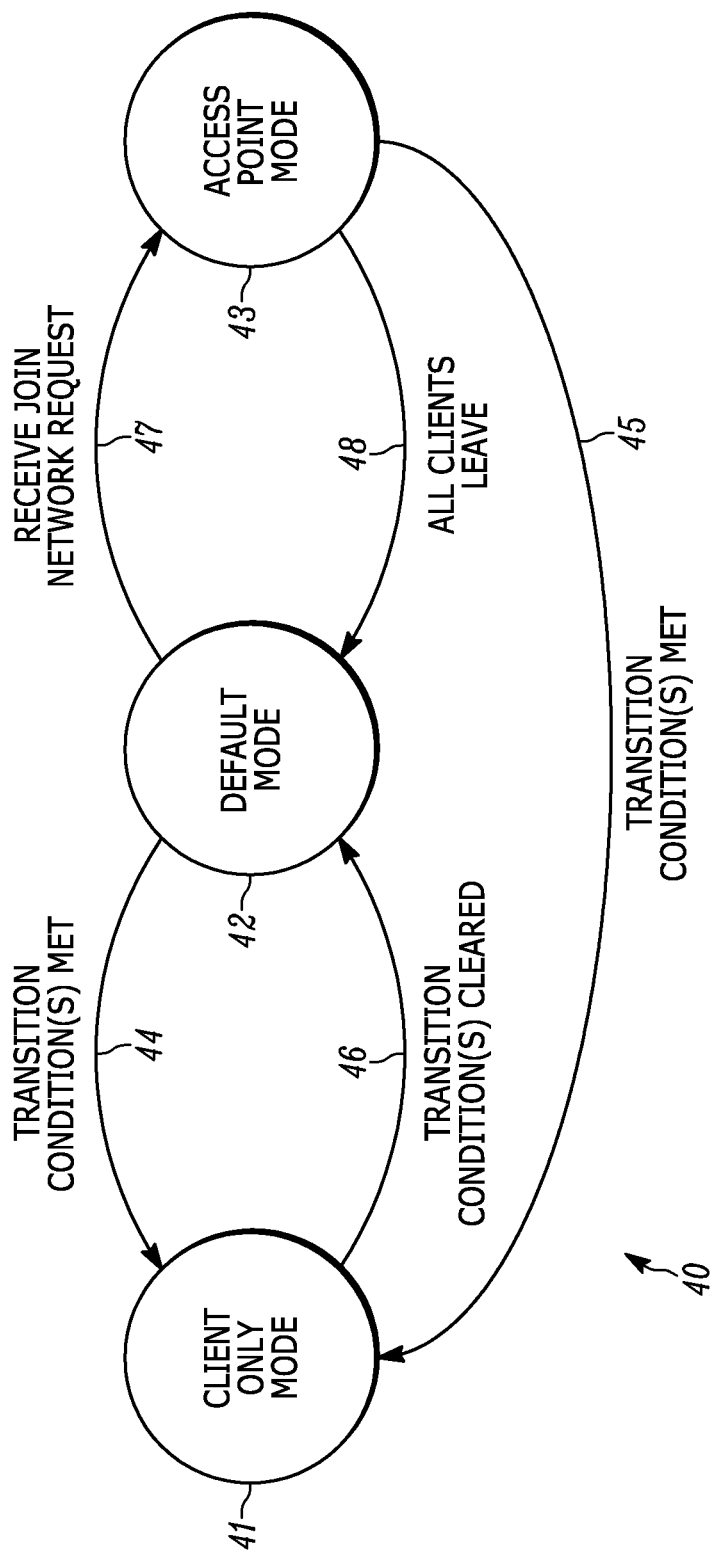
FIG. 3 is a state diagram for the modes of an ad hoc wireless networking device.

FIG. 3 is a state diagram 40 showing three states or operating modes for the ad hoc wireless networking device 11. The three states are client-only mode 41, decision or default mode 42, and access point mode 43 (AP mode).

Upon start-up, the ad hoc wireless networking device 11 is in the default mode 42. The default mode 42 prevents the broadcasting of beacons, but permits the ad hoc wireless networking device 11 to respond to find network requests, such as 802.11 probe requests. In some embodiments, in the default mode 42 the ad hoc wireless networking device 11 is capable of periodically sending a request to determine the presence and status of other ad hoc wireless networking devices. In the default mode 42, the ad hoc wireless networking device 11 continues to determine whether limiting conditions are present and whether other ad hoc wireless networking devices are seeking to join the ad hoc wireless network.

Transition to Client Mode

The ad hoc wireless networking device 11 transitions from the default mode 42 to the client-only mode 41 when transition condition 44 (one or more limiting condition(s) met) occurs or exists. The limiting conditions of transition condition 44 include various conditions where the wireless networking device 11 should not act as an access point.

For example, one limiting condition is movement of a mobile ad hoc wireless networking device 11 above a predetermined speed. The mobile ad hoc wireless networking device 11, itself, may detect movement at a speed greater than a predetermined speed or a configurable speed threshold with an accelerometer. For example, speed may be measured by an accelerometer provided on the mobile ad hoc wireless networking device 11 or by a global positioning system (GPS) detecting position(s) of the wireless networking device 11. The processor 12 executes the mode selection program 30 to determine when the mobile ad hoc wireless networking device is moving at a speed greater than the threshold. The processor 12 transitions to the client-only mode 41 when the mobile ad hoc wireless networking device is moving at a speed greater than the threshold. At speeds greater that the threshold, the mobile ad hoc wireless networking device 11 is likely to move outside the communication range of or lose communication with other wireless networking devices. As a consequence, acting as an access point would be temporary and transitioning between modes would occur too often for the ad hoc wireless networking device 11 to provide utility for the wireless network 10.

Another limiting condition is when the mobile ad hoc wireless networking device 11 is moving continuously or essentially continuously, even if at a low speed. As set forth above an accelerometer or a GPS arrangement may determine the essentially constant speed. The processor 12 of the mobile ad hoc wireless networking device 11 executes the mode selection program 30 to determine that the mobile ad hoc wireless networking device 11 is moving essentially continuously and places the mobile ad hoc wireless networking device in the client-only mode 41. This embodiment prevents a mobile ad hoc wireless networking device 11 that is likely going to be changing wireless network connections with other ad hoc wireless networking devices from operating as an access point.

Another limiting condition is when the power level of a battery of the ad hoc wireless networking device 11 is below a predetermined power level or a configurable power level threshold. The processor 12 of the ad hoc wireless networking device 11 executes the mode selection program 30 to transition from either of the default mode 42 to the client-only mode 41 when transition condition 44 occurs or transition from the access point mode 43 to the client-only mode 41 when transition condition 45 occurs. Transition condition 45 occurs when, for example, power stored in the battery of the ad hoc wireless networking device 11 has a power level that is less than a predetermined power level or configurable power level threshold. In one embodiment in the client-only mode 41, the ad hoc wireless networking device 11 conserves battery power by not responding to find network requests or probing polling requests from other ad hoc wireless networking devices.

In some embodiments, the limiting conditions of transition condition 45 also include operating at a speed greater than a predetermined speed and moving essentially continuously when in the access point mode 43 as discussed above with respect to transition condition 44. Thus, these conditions also result in a transition from the access point mode 43 to the client-only mode 41.

Once in the client-only mode 41 shown in FIG. 3, the ad hoc wireless networking device 11 stays in the client-only mode 41 until transition condition 46 (limiting condition(s) cleared) occurs. When all limiting conditions are cleared, i.e., transition condition 46 occurs, the mobile wireless networking device 11 transitions from the client-only mode 41 to the default mode 42.

For instance, the transition condition 46 may occur when a battery for the power supply of an ad hoc wireless networking device 11 is replaced; when the mobile ad hoc wireless networking device 11 stops moving, when the speed of the mobile wireless networking device 11 falls below a predetermined speed, or a combination of the foregoing exist.

Transition from Default Mode to Access Point Mode

When in default mode 42 shown in FIG. 3, the ad hoc wireless networking device 11 listens for beacons, find network requests, probe requests, and other messages or information from other ad hoc wireless networking devices. The ad hoc wireless networking device 11 transitions to access point mode 43 when transition condition 47 (receive join network request) occurs when another wireless networking device that represents a client sends a find network request and subsequently a join network request, such as an 802.11 association request frame or an 802.11 authentication frame. A transition from access point mode 43 to default mode 42 when transition condition 48 (all clients leave) occurs is discussed later herein.

Figure 4:
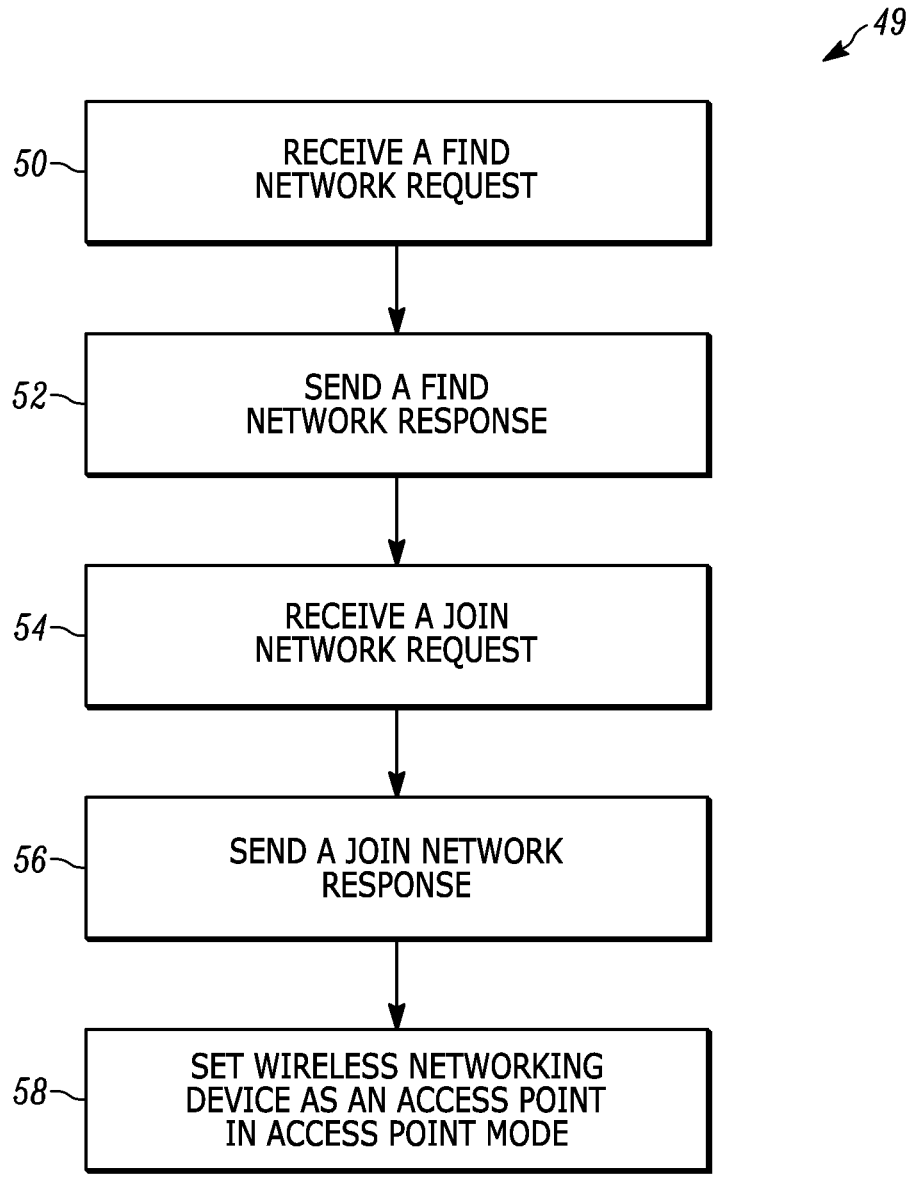
FIG. 4 is a flowchart showing execution of a method by an ad hoc wireless networking device that transitions from a default mode to an access point mode.

FIG. 4 is a flowchart 49 of a portion of the mode selection program 30 executed by a processor 12 of an ad hoc wireless networking device 11 located within an area that another wireless networking device is entering. The processor 12 of the ad hoc wireless networking device 11 executes the mode selection program 30 to select between the client-only mode 41, the default mode 42 and the access point mode 43. The wireless networking device 11 begins operation in the default mode 42.

At step 50 in FIG. 4, the processor 12 of the wireless networking device 11 listens for and receives a find network request from a searching wireless networking device that is searching for a wireless network 10. A find network request is a message, for example an 802.11 Probe Request Frame, to determine if there are any access points in the area. The processor 12 advances to step 52.

At step 52 in FIG. 4, the ad hoc wireless networking device 11 replies to the find network request by sending a find network response. The find network response is a message that can contain identification information commonly found in beacon frames, such as a network identifier (e.g., a Service Set Identifier SSID) associated with an incident area network and optionally, a wireless networking device identifier (e.g., a media access control (MAC) address, and other device identifiers. The find network response may further contain lists of available services and network routing information for those services. The find network response may also include status data of the ad hoc wireless networking device 11, such as battery power level and travelling speed. An example of this type of message is the IEEE 802.11 probe response. The processor 12 then advances to step 54.

In one embodiment, the find network request at step 50 contains a requested resource or service information. The ad hoc wireless networking device 11 at step 52 will not reply unless the device has a route to the requested resource or service (i.e., a link between a series of nodes within communication range of each other may be established to connect the device to the service).

At step 54, the ad hoc wireless networking device 11 receives a join network request sent by the searching wireless networking device. The join network request can be an 802.11 association frame or an 802.11 authentication frame. The processor 12 then advances to step 56.

At step 56 in FIG. 4, the ad hoc wireless networking device 11 permits associating with the searching wireless networking device by sending a join network response. The join network response indicates that the searching wireless networking device has successfully associated with the access point being provided by the wireless networking device 11. Thus, the searching wireless networking device becomes a client wireless networking device using the access point of the ad hoc wireless networking device 11. The processor then advances to step 58.

At step 58, the ad hoc wireless networking device 11 transitions from the default mode 42 to the access point mode 43 and operates as the access point for the client wireless networking device.

Step 56 is shown occurring before step 58 for purposes of illustration. The steps may occur simultaneously or in reverse order.

Operating as an access point in the access point mode 43, the ad hoc wireless networking device 11 broadcasts beacons periodically and serves as an access point to client wireless networking devices in association therewith. The wireless networking device 11 in access point mode 43 tracks and lists all of the client wireless networking devices using the wireless networking device 11 as an access point. Further, in the access point mode 43, the wireless networking device 11 associates with and offers connectivity to other wireless networking devices.

Transition from Access Point Mode to Default Mode

In typical use, the ad hoc wireless networking device 11 transitions from the access point mode 43 to the default mode 42 when transition condition 48 (all clients leave) occurs as shown in FIG. 3. Transition condition 48 exists when no client wireless networking devices are currently associated with the ad hoc wireless networking device.

When a client wireless networking device terminates its association with the wireless networking device in the access point mode 43, the wireless networking devices are referred to as "disassociated." As is known in the art and documented in 802.11, there are many reasons that client wireless networking devices disassociate from an access point. For instance, another access point may provide other services, better bandwidth, better signal strength, signal to noise ratio (SNR), etc. In these instances the client wireless networking device would switch to a node providing another access point.

There are various embodiments for determining that all the client wireless networking devices have disassociated from an ad hoc wireless networking device 11 acting as an access point. In one embodiment, the processor 12 of the ad hoc wireless networking device 11 operating in access point mode 43 determines or decides after a period of time or a predetermined time delay with no association with a client wireless networking device, that the client ad hoc wireless networking device should be removed from a list of client wireless networking devices stored in memory as using the ad hoc wireless networking device 11. Thereafter, when all of the client wireless networking devices are disassociated from the ad hoc wireless networking device 11 and removed from the list, the wireless networking device 11 executes the mode selection program 30 to transition from the access point mode 43 to the default mode 42 and stops transmitting beacons.

In another embodiment, the client ad hoc wireless networking device in non-access point mode periodically sends a keep-alive message to the ad hoc wireless networking device 11 in access point mode 43 to remain on the list as a client. The keep-alive message is sent when there has been no traffic between the two ad hoc wireless networking devices for a long period of time, but less than a connection time-out value.

In another embodiment, the access point of the ad hoc wireless networking device 11 in access point mode 43 periodically sends out hello messages to client ad hoc wireless networking devices operating in non-access point mode therewith. Client ad hoc wireless networking devices that do not respond to the hello messages are removed from the list of the ad hoc wireless networking device 11.

The keep-alive and hello messages are sent less frequently than the beacon time (for example, in one embodiment 100 times or longer), and occur only when no other traffic is sent to the access point (i.e., the ad hoc wireless networking device 11 operating in the access point mode 43) or to the client ad hoc wireless networking device in the non-access point mode, respectively. Thus, adding the keep alive/hello messages to the wireless network 10 of ad hoc wireless networking devices does not negate the benefits of selectively suppressing beacons. Also, suppressing beacons saves bandwidth and battery life, as there is no requirement for the suppression to occur immediately when a client ad hoc wireless networking device has disassociated and there is no requirement to quickly discover that the client ad hoc wireless networking device has disassociated. This is in contrast to link state routing where the link state advertisement needs to be triggered as soon as there is a topology change to prevent routing loops.

In another embodiment, a first ad hoc wireless networking device 11 in access point mode 43 receives a disconnect signal from a second client ad hoc wireless networking device that indicates that the second ad hoc wireless networking device has disassociated from the first ad hoc wireless networking device 11. The second client ad hoc wireless networking device is removed from the list of client devices using the access point.

The first ad hoc wireless networking device 11 transitions from the access point mode 43 to the default mode 42 when there are no other client ad hoc wireless networking devices associated with the first ad hoc wireless networking device 11 as an access point, and no other ad hoc wireless networking devices are polling the first ad hoc wireless networking device 11.

In the various embodiments, the ad hoc wireless networking devices 11 are one or more of a mix of mobile and stationary devices, such as two-way radios, public safety long term evolution (PS LTE) devices, smart phones, tablets, surveillance cameras, unmanned aerial vehicles (UAVs) and devices in command vehicles. In order to enable all network nodes to discover and access services in this potentially highly dynamic and mobile environment, the incident area network 10 needs to support multi-hop routing.

Figure 5:
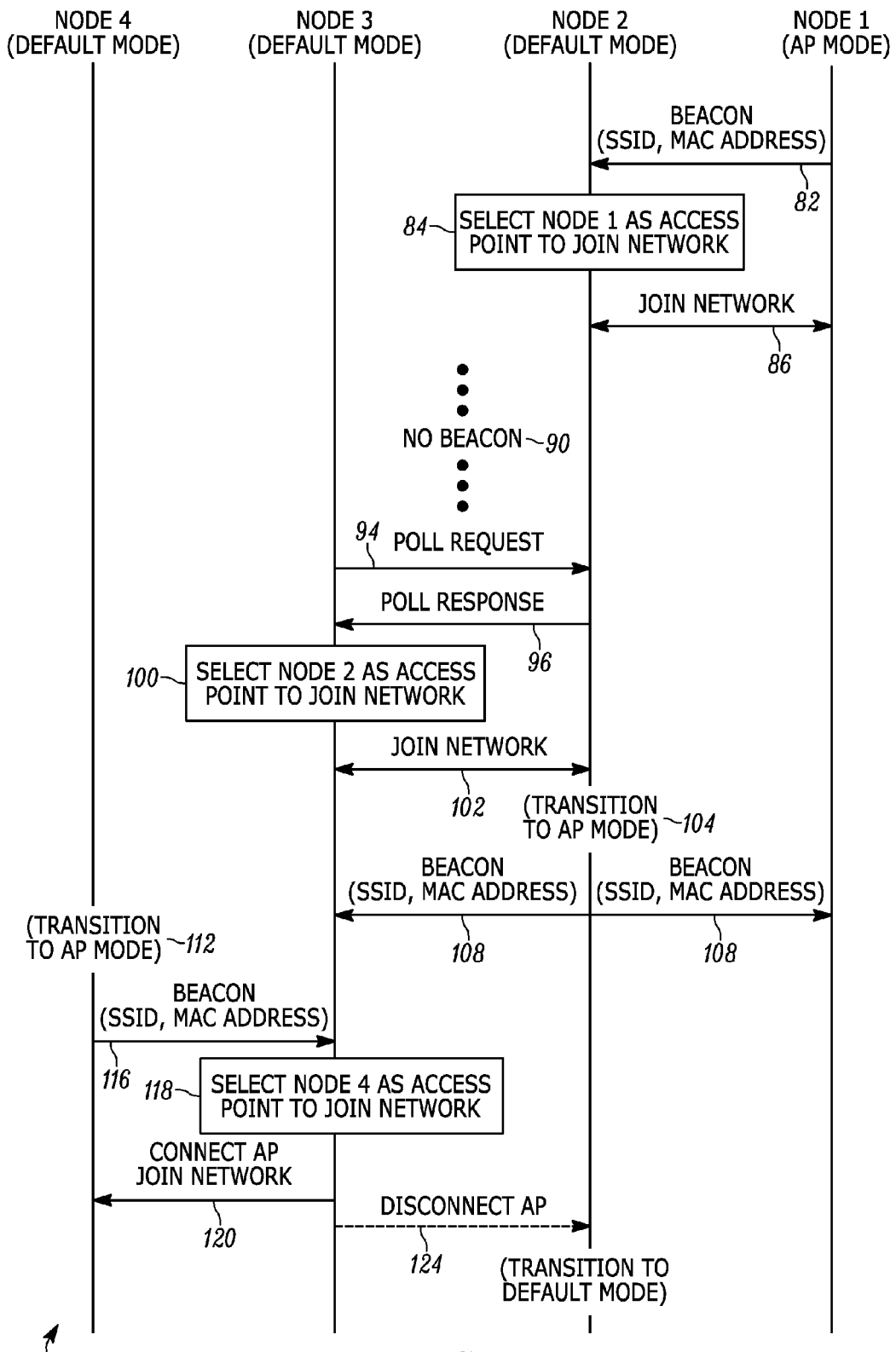
FIG. 5 is a functional diagram showing an example of a method of nodes joining a wireless ad hoc network, transitioning between modes, and switching access points.

FIG. 5 is an operational diagram 80 illustrating an example of the operation of nodes 1 through 4 (depicted in FIG. 3). Each of nodes 1 through 4 includes an ad hoc wireless networking device 11 that is access-point capable. In FIG. 5, time progresses from the top of the figure to the bottom of the figure. Node 1 in FIG. 5 is operating in the access point mode 43 and broadcasts beacons at operation 82. Node 2 is operating in the default mode 42. Node 2 receives the beacon (which may include a service set identifier (SSID) and media access control (MAC) address) from node 1. The beacon may also include other device identifiers, such as an internet protocol (IP) address. Node 2 uses the beacon information to determine a wireless network 10 to join (block 84). At operation 86, node 2 sends a join network request to node 1 indicating that node 2 wants to join the wireless network 10 with node 1 as an access point. In response, node 1 enables association with node 2. Thus, node 1 operates as an access point and node 2 operates in a default mode as a client of node 1. Node 2 directly associates via node 1 (one hop).

In the set of circumstances described above, node 2 did not send a find network request to join node 1, as node 2 received a beacon from the access point provided by node 1. Node 2 operates in the default mode 42 and as a consequence, no beacon is broadcast by node 2 (illustrated by status "no beacon" 90 in FIG. 5).

Thereafter, node 2, receives a probing request (e.g. find network request) from the node 3 at operation 94. In response to the probing request, node 2 sends a probe response (e.g. find network response) at operation 98 with a service set identifier and other information (even when the node 2 is operating in default mode 42). In view of the information in the probe response, node 3 identifies and selects node 2 as an AP-capable node connected to the requested wireless network 10 to join (at block 100). Node 3 sends a join network request to the node 2, and node 2 enables association with node 3 at operation 102. To associate with the node 3, node 2 switches to or transitions to access point mode 43 at operation 104 (transition to AP mode). At this time, nodes 1 and 2 are each in access point mode 43 and node 3 is operating in a non-access point mode, more specifically in the default mode 42.

After operation 104, node 2 is in the access point mode 43 and broadcasts a beacon at operation 108. The beacon is received by other nodes, such as node 3 and node 1. Node 1 is also in the access point mode 43 and broadcasts a beacon.

Due to various factors, node 4 transitions to access point mode 43 at operation 112 (transition to AP mode) and broadcasts a beacon which is received by node 3 (at operation 116 in FIG. 5). In this scenario, node 3 receives multiple beacons, including the beacons broadcast by node 4 and node 2.

In one embodiment, the processor 12 of the client wireless networking device of node 3 executes an arbitration algorithm stored in memory that takes the capabilities of the wireless networking devices provided in the beacons (e.g., central processor unit (CPU) memory) and status (idle, battery power level, speed, etc.) for each of nodes 2 and 4 into account for selecting or determining the node to operate in the access point mode 43.

In another embodiment, the processor 12 of the client wireless networking device of node 3 determines that the signal strength of the beacon broadcast by node 4 is greater than the signal strength of the beacon broadcast by node 2. At a certain signal strength level, or another factor, such as better or more relevant connectivity to other nodes or services, or the beacon from node 2 to node 3 being lost entirely, node 3 selects node 4 as the access point to join at operation 118. Then node 3 sends a join network request to node 4 and switches or changes to associate with the access point of node 4 at operation 120 (connect AP join network).

As shown in FIG. 5, in some embodiments, node 3 sends a disconnect signal to node 2 at operation 124. Then, node 2 removes node 3 from a list of associated client wireless networking devices. As discussed above, in other embodiments, the node 2 decides, after a predetermined time with no association with the node 3, that the node 3 is no longer in using node 2 as an access point, or is associated with the access point of another node. Thus, the node 2 removes node 3 from its list of associated client nodes.

While node 3 is disassociated from the wireless networking device 11 of node 2 (operating in the access point mode 43), the former client wireless networking device of node 3 may still choose to route packets through the access point of the node 2. Thus, node 3 may still use node 2 as a router.

If there is no other node associated with the node 2 as an access point, node 2 transitions to default mode 42 at operation 128. Thereafter, if node 3 decides to reconnect to node 2, node 3 must send a join network request to node 2 to rejoin and the wireless networking device 11 of node 2 must transition to the access point mode 43.

The above arrangement of FIG. 5 describes one example of a handoff of a wireless networking device 11 at node 3 from the access point of node 2 to the access point of node 4. Thus, node 3 associates with the access point of node 4 after disassociating with the access point of node 2.

At this point in time, node 2 discovers that it no longer has any nodes associated with it. Node 2 then, or after a brief period of time, transitions back to the default mode 42.

In one embodiment, the find network request (e.g. probe request) contains a requested resource or service. In this embodiment, a responding ad hoc wireless networking device 11 would only reply if the ad hoc wireless networking device 11 has a route to the requested resource or service. In some embodiments, the beacon broadcast by the ad hoc wireless networking device 11 includes a service advertisement information element (SAIE) with information of available network services accessible in the wireless network 10 and how to access these network services.

While some embodiments are directed to public safety ad hoc networks, non-public safety ad hoc networks and other wireless ad hoc networks are contemplated.

In another embodiment, the find network request is a reactive routing request such as an Ad hoc On-Demand Distance Vector (AODV) routing request. Internet Engineering Task Force (IETF) Request for Comments (RFC) 3561 provides parameters for a routing request (RREQ) arrangement.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having,"

"includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method of transitioning a wireless networking device from one mode to another mode, the method comprising:
    setting an operating mode of a first wireless networking device to a non-access point default mode, and operating the first wireless networking device in an ad hoc wireless network as a non-access point,
    receiving a find network request including a requested resource or a requested service,
    determining when the first wireless networking device has a multi-hop route to a device providing the requested resource or the requested service,
    responding to the find network request with a find network response only when the first wireless networking device has the multi-hop route to the device providing the requested resource or the requested service, and
    receiving a join network request and responding with a join network response and transitioning the first wireless networking device to an access point mode to associate with and offer connectivity to other wireless networking devices based on receiving the join network request.

2. The method of claim 1, wherein operating in the ad hoc wireless network in the non-access point mode includes associating with another wireless networking device which is operating as an access point.

3. The method according to claim 1, wherein the find network response includes information about available network services accessible through the wireless networking device.

4. The method according to claim 1, wherein the find network response includes one or more from a group consisting of network routing information and service information of services available in the ad hoc wireless network.

5. The method according to claim 1, further comprising transitioning the wireless networking device from the access point mode to a default mode when no other wireless networking device is currently associated with the wireless networking device while in the access point mode.

6. The method according to claim 1, wherein the find network request that is received includes a routing request.

7. The method according to claim 1, further comprising transitioning the wireless networking device from the access point mode to a client-only mode when power stored in a battery of the wireless networking device is less than a configurable power level threshold.

8. The method according to claim 1, further comprising transitioning the wireless networking device from the access point mode to a client-only mode in response to at least one from a group consisting of the wireless networking device moving at a speed greater than a threshold and the wireless networking device moving at an essentially constant speed.

9. The method according to claim 1, wherein the join network request includes an association request.

10. The method of claim 1 further comprising:
    determining with the first wireless networking device that a second wireless networking device has disassociated from the first wireless networking device and no other wireless networking devices are associated with the first wireless networking device as an access point; and when no other wireless networking devices are associated with the first wireless networking device as the access point, transitioning the first wireless networking device from an access point mode to the non-access point mode, wherein the first wireless networking device operates to prevent broadcasting of beacons in the non-access point mode.

11. The method according to claim 10, the first wireless networking device determining that the second wireless networking device has disassociated from the first wireless networking device after a predetermined time delay with no association with the second wireless networking device.

12. The method according to claim 10, the first wireless networking device determining that the second wireless networking device has disassociated from the first wireless networking device when the first wireless networking device receives a disconnect signal from the second wireless networking device.

13. The method according to claim 10, wherein the first wireless networking device sends a find network request and receives a find network response from another wireless networking device.

14. The method according to claim 10, further comprising:

determining when limiting conditions are present for the first wireless networking device, and when the limiting conditions are present, transitioning to a client-only mode.

15. The method according to claim 14, wherein the limiting conditions include at least one selected from a group consisting of the first wireless networking device moving at a speed greater than a threshold, a power level of a battery of the first wireless networking device being below a predetermined power level, and the first wireless networking device moving at an essentially constant speed.

* * * * *